United States Patent [19]

Kah, Jr.

[11] 4,029,918
[45] June 14, 1977

[54] CONTINUOUS CYCLE TIMER HAVING ADJUSTABLE DAY AND TIME PERIODS OF OPERATION

[76] Inventor: Carl L. C. Kah, Jr., 778 Lakeside Drive, North Palm Beach, Fla. 33408

[22] Filed: Mar. 27, 1975

[21] Appl. No.: 562,650

[52] U.S. Cl. .................... 200/38 D; 200/38 CA; 200/38 DA
[51] Int. Cl.² .................................. H01H 43/00
[58] Field of Search ............ 200/35 R, 37 R, 37 A, 200/38 R, 38 B, 38 BA, 38 C, 38 CA, 38 D, 38 DA, 38 DB, 38 DC

[56] References Cited

UNITED STATES PATENTS

| | | | |
|---|---|---|---|
| 2,360,179 | 10/1944 | Urbas et al. | 200/38 D |
| 2,816,184 | 12/1957 | Manning et al. | 200/37 A X |
| 3,101,418 | 8/1963 | Gould | 200/38 CA X |
| 3,194,086 | 7/1965 | Laschenski | 200/38 CA X |
| 3,207,866 | 9/1965 | Hicks | 200/38 DB |
| 3,330,917 | 7/1967 | Grundfest | 200/38 R |
| 3,811,019 | 5/1974 | Solari | 200/38 D X |

*Primary Examiner*—James R. Scott
*Attorney, Agent, or Firm*—Jack N. McCarthy

[57] ABSTRACT

A timing device has a day dial and a time dial which rotate to control an electrical output in a programmed manner for a predetermined day period. The time dial and day dial operate a pivotally mounted lever to actuate a switch which is connected between electrical input and output, or load, connectors. The time dial operatively contacts one end of the lever and the day dial operatively contacts the other end of the lever when the dials have been preset to do so by the use of actuating pins which can be positioned in the dials. When both ends of the lever are contacted, the switch is actuated. The pins can be held in their respective time dial or day dial in an operative or inoperative position. Manual means are also provided to bypass the time dial and day dial by directly connecting the input connectors to the output, or load, connectors.

35 Claims, 19 Drawing Figures

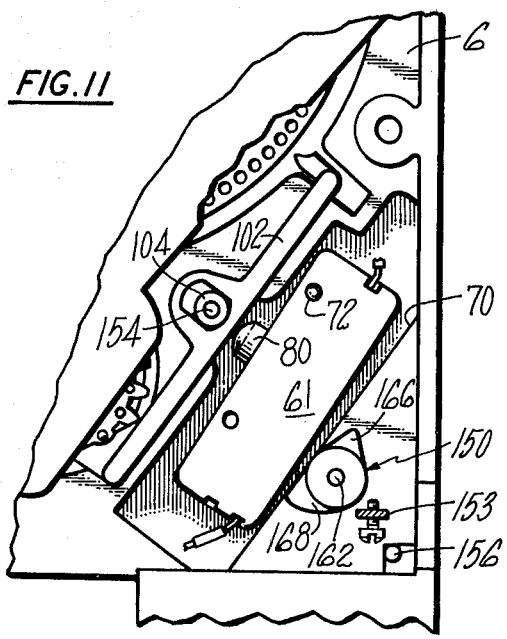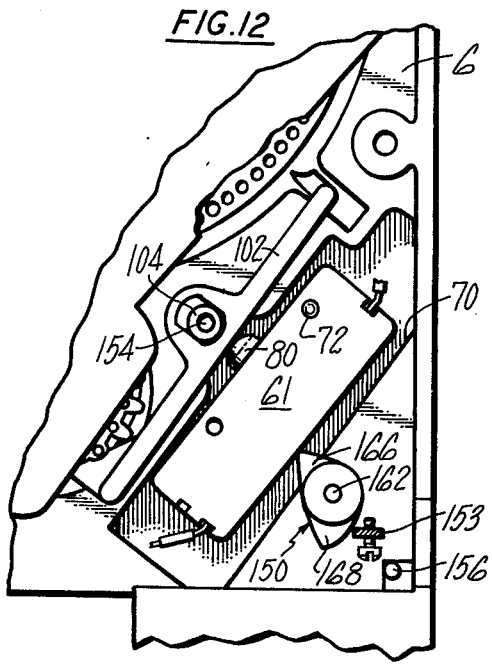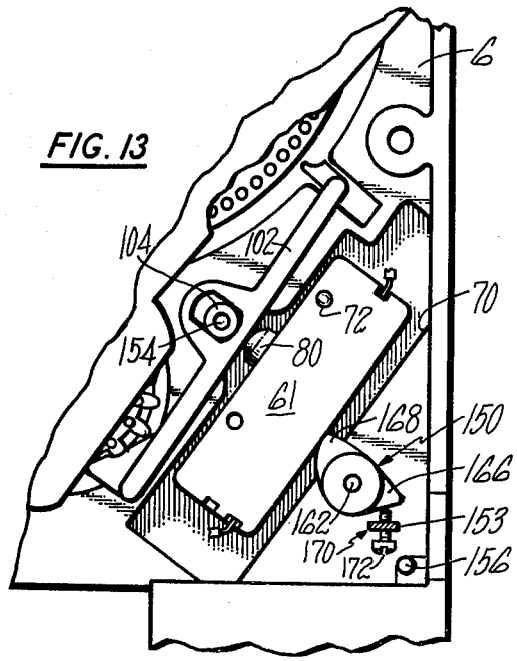

CONTINUOUS CYCLE TIMER HAVING ADJUSTABLE DAY AND TIME PERIODS OF OPERATION

BACKGROUND OF THE INVENTION

This invention relates generally to timing devices for predetermining actuation of an electrically operated device. A timing device used for controlling electrical equipment is shown in U.S. Pat. No. 3,330,917.

SUMMARY OF THE INVENTION

A primary object of this invention is to provide a timing device which will control an electrical output in a programmed manner for a predetermined period.

In accordance with the present invention, a time dial and day dial operate a pivotally mounted lever to actuate a switch which is connected between electrical input and output, or load, connectors.

It is object of this timing device to be able to provide very short timing periods and also provide means for extending said timing periods.

In accordance with the present invention, actuating pins are provided for each time dial and day dial which contact opposite ends of a pivotally mounted lever to actuate a switch which connects electrical input connectors to output, or load, connectors.

In accordance with the present invention, actuating pins are provided having two actuating portions; when one actuating pin is positioned in a time dial, an upper arcuate surface is used to provide operative contact with a pivotally mounted lever and when one actuating pin is positioned in a day dial, a lower cylindrical surface is used to provide operative contact with said pivotally mounted lever.

In accordance with the present invention, actuating pins are provided having arcuate surfaces of different arcuate lengths to provide for contacting the pivotal lever for different lengths of time.

In accordance with the present invention, the time dial has openings arranged for actuating pins so that several actuating pins can be placed side by side to provide for actuation for a longer period of time amounting to the total of the length of the arcuate surfaces of the adjacent pins.

It is an object of this invention to provide means for bypassing automatic time dial and day dial operation by directly connecting the input connectors to the output, or load, connectors.

In accordance with the present invention, a system can be provided which will periodically automatically provide for precise positioning of a time dial with a device being operated having a predetermined number of cyclic positions.

BRIEF DESCRIPTION OF THE DRAWINGS

FIG. 11 is a view showing a modification of the timing device wherein the micro switch is in a housing which is mechanically pivoted with the mechanical actuator being shown in an "OFF" position;
FIG. 12 is a view similar to FIG. 11 showing the mechanical actuator in an "ON" position;
FIG. 13 is a view similar to FIG. 11 showing the mechanical actuator in an "AUTO" position to achieve a micro switch position which will allow it to be actuated when a pin is present at the proper location in the day dial and hour dial as in FIG. 10.

BRIEF DESCRIPTION OF THE PREFERRED EMBODIMENT

Figure 1:
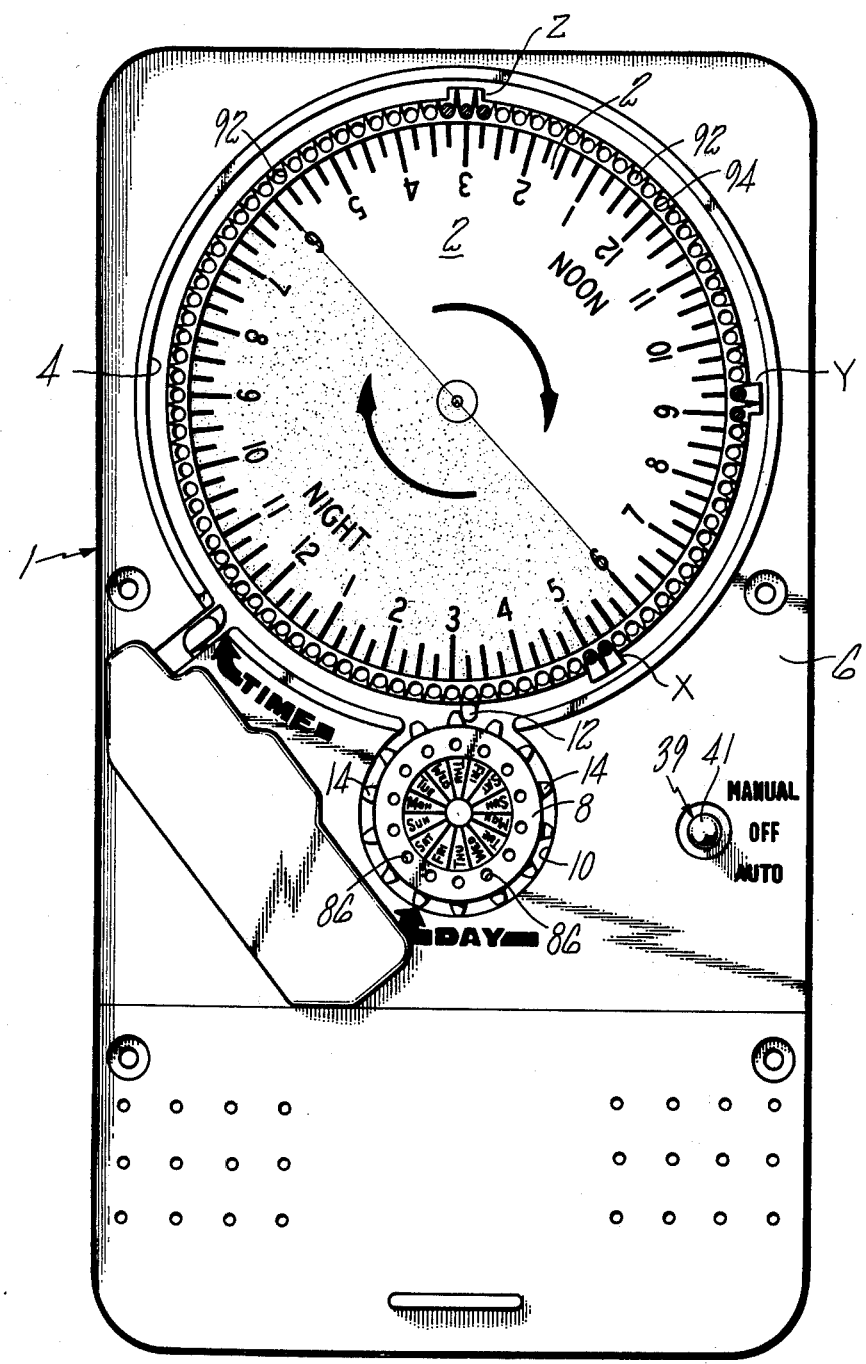
FIG. 1 is a front view of the timing device.

Referring to FIG. 1, a timer clock device 1 is shown from the front having a large time dial 2 mounted for rotation in a recess 4 in a housing plate 6. A day dial 8 is mounted for rotation in a recess 10 located adjacent recess 4. The recesses overlap each other so that there can be cooperation between the two dials in a manner to be hereinafter described. The word TIME appears on the face of the housing plate 6 and has an arrowhead pointing to an area where the approximate time is indicated. The word DAY appears on the face of the housing plate 6 and has an arrowhead pointing to an area where the day is indicated.

In the device shown, the time dial includes 24 hours divided into night and day, with 14 days appearing on the day dial. Since the time dial 2 includes a 24-hour period, an arm 12 extends radially outward from the bottom edge thereof to contact projections 14 on the day dial so that for every rotation of the time dial indicating 24 hours, the day dial 8 will be moved to indicate the next day. A spring means 19 is fixed to the bottom of the housing plate 6 and extends through an opening in the side of recess 10 to maintain the day dial in position with the DAY arrowhead pointing at a day until it is rotated to point to the next day.

Figure 2:
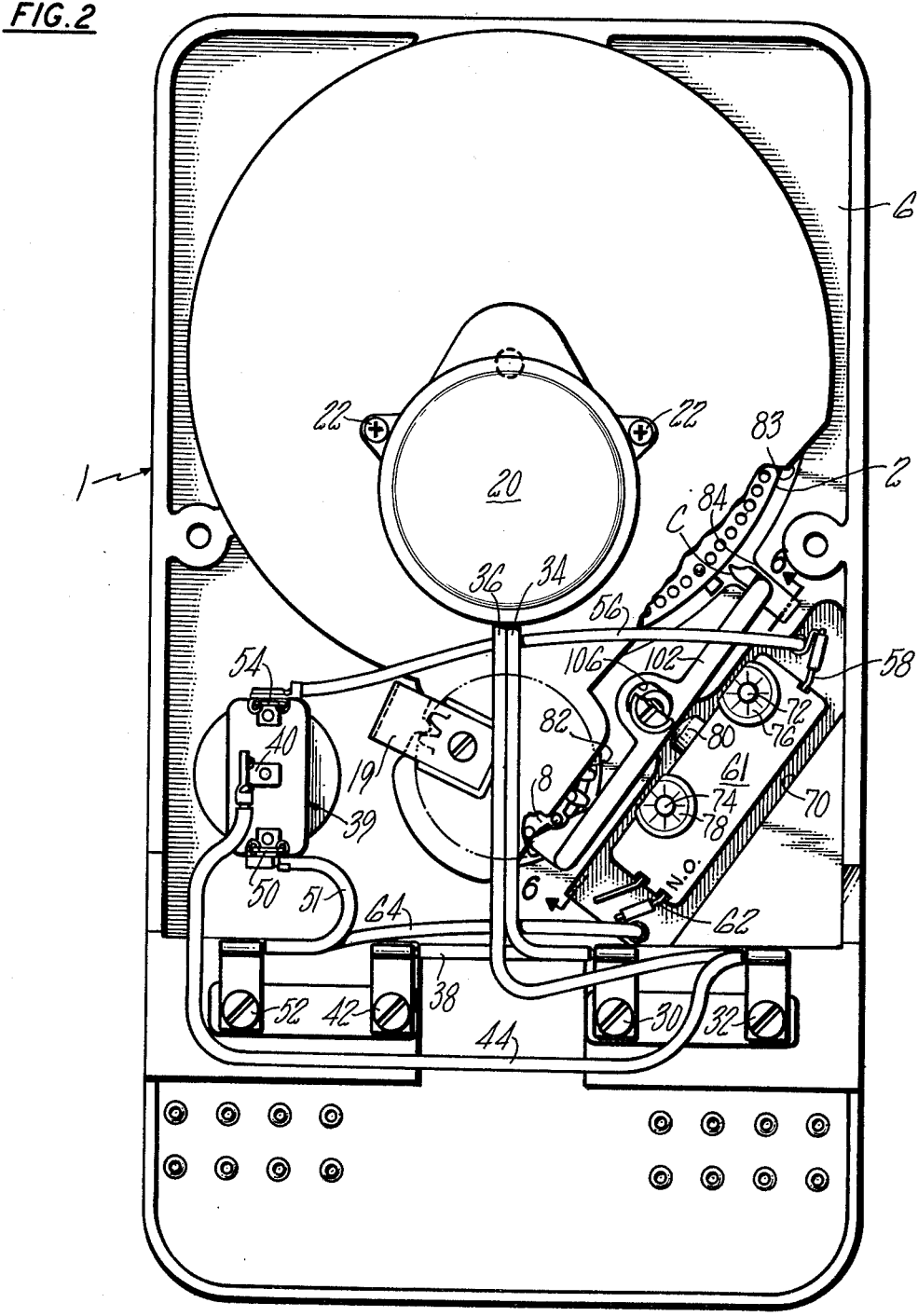
FIG. 2 is a back view of the timing device.

As seen in FIG. 2, a standard self-contained electric synchronous clock motor 20 with a gear train is fixed to the back of the housing plate 6 by screws 22. An output shaft of the gear train is connected to said time dial so that it rotates the dial one revolution for every 24 hours. It is to be understood that other hour representations can appear on the time dial and other numbers of days can appear on the day dial.

To provide for sending out a load signal at predetermined times for predetermined days, the following electric circuitry is connected to the back of the housing plate 6. Two input connectors 30 and 32 receive current from an outside supply. Connector 30 is connected to the motor 20 by a line 34 and connector 32 is connected to the motor 20 by line 36. This provides the power for continuously running the synchronous clock motor 20. Input connector 30 is connected to an output or load connector 42 by line 38.

Input connector 32 is connected to a connector 40 of a three-way toggle switch 39 by a line 44. A movable connector 46 in switch 39 has one end connected to the connector 40 and can be moved between a center "OFF" position, an "AUTOMATIC" position, and a "MANUAL" position. The "OFF" connector 48 merely provides a dead end for the movable connector 46. The "MANUAL" connector 50 is connected by a line 51 to the other output or load connector 52. The "AUTOMATIC" connector 54 is connected by a line 56 to a connector 58 of a normally open micro switch 60. Another connector 62 of the micro switch 60 is connected by a line 64 to the output or load connector 52. The micro switch 60 has a movable connector 66 which is closed by action of the timer clock device 1 when both a setting for a predetermined time and a predetermined day is in its proper position in a manner which will be hereinafter described.

The switch 39 is fixed to the rear of the housing plate 6 and has an operating toggle member 41 which extends through to the front of the housing plate 6 for use in operating the switch. The markings "MANUAL", "OFF" and "AUTO" are positioned on the front of the housing plate 6 so that the toggle 41 can properly position the movable connector 46 to place it in its desired operating position; the "MANUAL" position to achieve a continuous load output; the "OFF" position to achieve no load output; or "AUTO" position to achieve a load at a predetermined hour and day for a predetermined time period.

Figure 19:
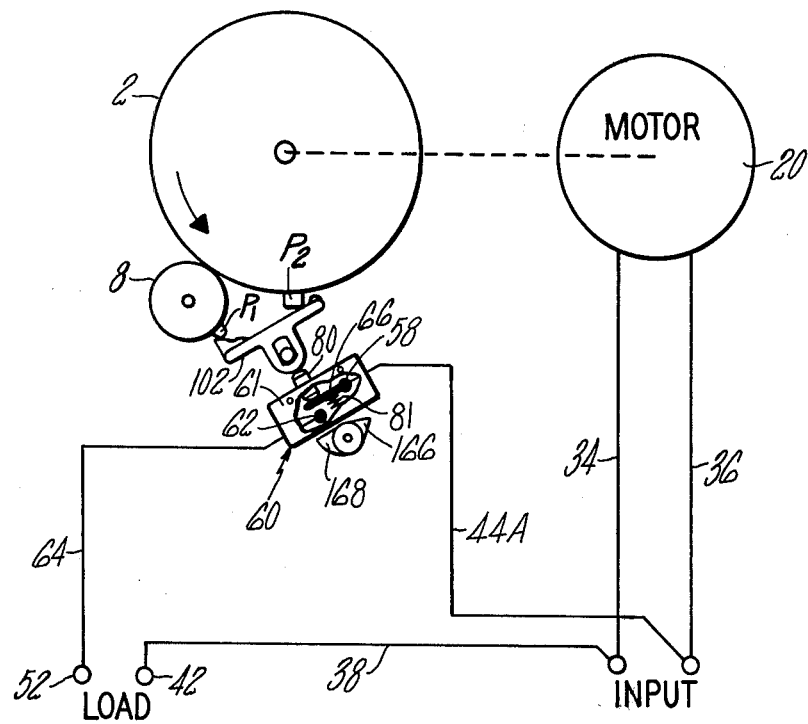
FIG. 19 is a schematic diagram of the electric circuitry on the housing plate in the modification shown in FIGS. 11-16.

Micro switch 60 is fixedly located in a housing 61 in a recess 70 to properly position it for actuation by the time dial 2 and day dial 8 in a manner to be hereinafter described. The micro switch housing 61 is fixed in the recess on two posts 72 and 74 which extend from the bottom of the recess and extend upwardly therefrom. These posts 72 and 74 extend through holes in the micro switch housing 61 and have fasteners 76 and 78 fixed to the posts, respectively, for mounting the micro switch in position. An operating button 80 extends from a side of the micro switch housing 61 facing toward the peripheries of the time dial 2 and the day dial 8. The button 80 is biased outwardly by a spring means 80 (such as shown in FIG. 19), keeping the switch in its normally open position.

A section of the side and bottom of the recess 10 for day dial 8 is cut away at 82 so that the bottom of the day dial 8 is easily accessible from the back of the housing plate and an elongated opening 84 extends outwardly from the side of the recess 4 for time dial 2 through to the back of the housing plate 6 so that the side of the time dial 2 is accessible from the back. A section of the side and bottom of the recess 4 for time dial 2 is also cut away at 83. The day dial 8 includes 14 of the projections 14 with each one of the days being noted at the center of the dial radially in line with each projection. An opening 86 extends through the day dial adjacent the base of each of the projections 14 to receive an actuator pin 90 for a purpose to be hereinafter described.

The periphery of the time dial 2 is formed having a plurality of openings 92 around a bottom flange-like portion 93 thereof, with a guide slot 94 being positioned thereover which is open at the periphery of the time dial 2. Each opening 92 and guide slot 94 receives an actuator pin in a manner to be hereinafter described.

Ninety-six openings 92, along with associated guide slots 94 are located around the time dial 2, making each opening responsible for 1/96 of the full 24-hour period, which is equal to 15 minutes.

An actuator pin 90 (see FIG. 3) is formed with its lower portion as a cylindrical pin 96 which will fit into both openings 86 of day dial 8 and openings 92 of time dial 2. An arcuate segment 98 extends from the upper part of the actuator pin 90 with the inner portion 98A being formed to fit the guide slot 94, to fixedly position the actuator pin 90. The outer portion 98B of arcuate segment 98 being the cam portion of the actuator pin 90 for the time dial 2 while the cylindrical pin 96 is the cam portion of the actuator pin 90 for the day dial 8, this camming action occurring when the actuator pin 90 is in its "operative" position in its respective dial—time dial 2 or day dial 8. A finger grip 100 is provided at the top of the actuator pin 90 to move it into and out of position in the openings 86 and 92. If an actuator pin is to present a segment which will represent 15 minutes, it must have an arc face of a length which is 1/96 of the circumference of a circle which has a radius equal to that of the time dial 2, plus the extension of the outer portion 98B of the arcuate segment which extends past the circumference of the time dial 2.

Figure 3:
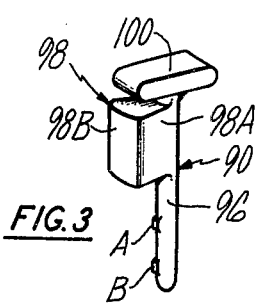
FIG. 3 is an enlarged perspective view of an actuator pin.

The actuator pin 90 shown in FIG. 3 is a "15-minute" pin as the arcuate segment 98 has a full outer portion 98B with a full width at its outer arc face. Pins 90 representing other periods of time can be used, such as a pin having one-half of an outer portion 98B with a one-half width at its outer arc face—such an actuator pin would be a "7½-minute" pin. It can be seen that the one-half of the outer portion could extend from anywhere along the inner portion 98A of an actuator pin 90. See FIG. 1 where at X two "15-minute" pins 90 are placed side by side, making a 30-minute camming surface; at Y a "15-minute" pin 90 and a "7½-minute" pin 90 are placed together to make a 22½-minute camming surface; and at Z where a "15-minute" pin 90 has a "7½-minute" pin 90 placed on each side to make a 30-minute camming surface which would be shifted around the circumference of the time dial 2 from the use of two "15-minute" pins 90 side by side. In a construction made, "15-minute", "7½-minute", and "3¾- minute" pins were used. These pins can be given colors to aid in their identification by operating time.

A micro switch actuation lever 102 is pivotally mounted on the rear of the housing plate 6 to have one end cooperate with the cylindrical pin 96 of actuator pins 90 in the day dial in their "operative" position and to have the other end cooperate with the outer portion 98B of the actuator pins 90 in the time dial in their "operative" position for contacting the button 80 and closing the micro switch 60; this action providing an output at a predetermined time, and for a predetermined length of time.

An actuation lever 102 if pivotally mounted adjacent its center on a pin 104 which extends through an opening 106, the opening 106 being elongated to permit the actuation lever 102 to move inwardly towards the button 80 when both ends of the actuation lever 102 contact the respective operating parts of the actuator pins 90 of the time dial 2 and day dial 8 at the same time. The pin 104 is in alignment with the line of action of the operating button 80 of the micro switch. The end of the actuation lever 102 which contacts the actuator pins 90 in the time dial 2 includes an extension 108. This extension 108 extends through the opening 84 and has a projection 109 to contact the arc faces of outer portion 98B of the arcuate segment 98 when the pins are in their "operative" position on the time dial 2. (See FIGS. 8 and 10.)

Figure 5:
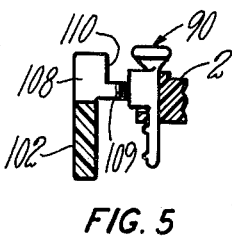
FIG. 5 is a sectional view showing an actuator pin in an "operative" position on the time dial.
Figure 4:
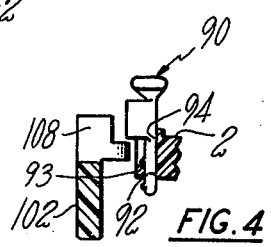
FIG. 4 is a sectional view showing an actuator pin in an inoperative position on the time dial.

The projection 109 has a cutout portion at 110 so that the outer portion 98B of the arcuate segment 98 of the actuator pin 90 does not contact the projection 109 when the pin is in its inoperative position and passing the projection 109. Note FIG. 4 where the actuator pin is placed in an opening 92 and held between two small protuberances A and B when the pin is merely positioned in the dial for holding the pin. When the pin is pushed into an "operative" position, both protuberances A and B are below the bottom of the dial—see FIG. 5. The outer portion 98B of the arcuate segment 98 can then contact the projection 109 as it passes. This projection is curved at C to ride easily up on the outer portion 98B of the arcuate segment 98. The tip of the projection points at the time on the time dial 2.

Figure 7:
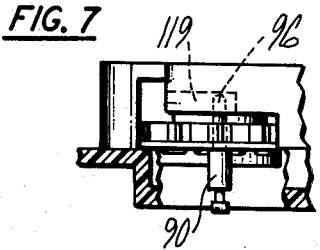
FIG. 7 is a fragmentary view of FIG. 6 showing an actuator pin in an "operative" position on the day dial.
Figure 9:
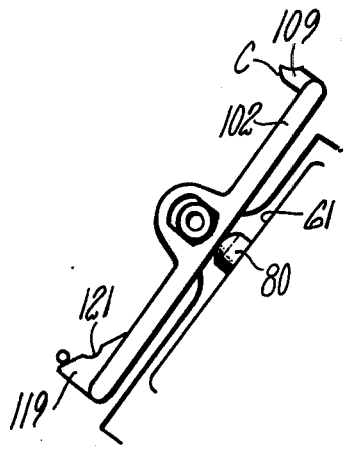
FIG. 9 is a view of the switch actuation lever with one end opposite and contacting a cylindrical pin of an actuator pin of the day dial with the other end not being in contact with an arc face of an actuator pin in the time dial.
Figure 10:
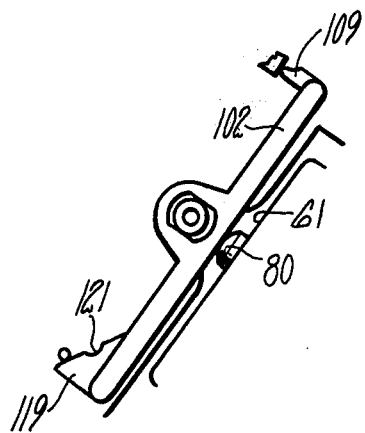
FIG. 10 is a view showing the switch actuation lever in its actuating position with one end opposite and contacting an arc face of an actuator pin in the time dial with the other end opposite and contacting a cylindrical pin of an actuator pin in the day dial and with the center actuating a micro switch.

The end of the actuation lever 102 which contacts the actuator pins 90 in the day dial 8 has a projection 119 to contact the cylindrical pin 96 when the actuator pins 90 are in their "operative" position on the day dial 8 (see FIGS. 7, 9 and 10). A portion of the actuating lever 102 is cut out at 120 so that the projection 119 can extend adjacent to the rear face of the day dial 8. The cut out portion 120 is of such a size so as to position the projection 119 a predetermined distance from the back of the day dial 8 so that when the actuator pin is placed in an opening 86 and held between the two small protuberances A and B, the pin is merely positioned in the dial for holding the pin. When the pin is pushed into an "operative" position, both protuberances A and B are below the bottom of the dial (see FIG. 7). The cylindrical pin 96 can then contact the projection 119 for a given day.

Figure 8:
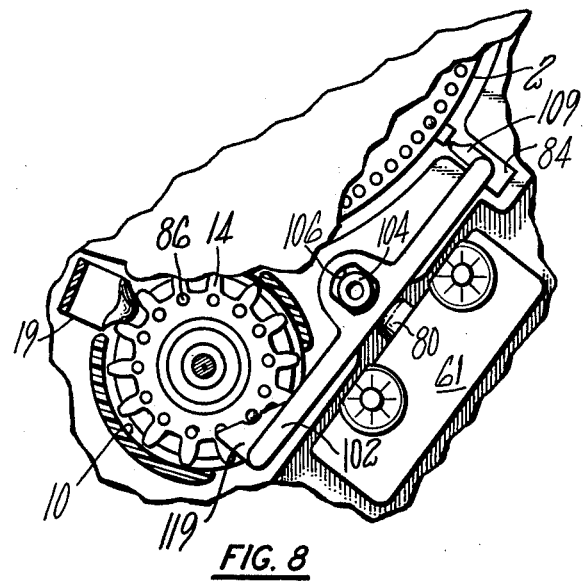
FIG. 8 is a view of the switch actuation lever with one end opposite and contacting an arc face of an actuator pin of the time dial with the other end not being contacted by a cylindrical pin of an actuator pin in the day dial.

The projection 119 has a notch 121 therein to prevent a pin in an adjacent day to the day indicated, having an effect on the projection 119 (see FIG. 8).

It can be seen that if the day dial is moved to an indicated day having an actuator pin 90 in an "operative" position, the cylindrical pin 96 is positioned to contact the projection 119 of the actuation lever 102. Then for that indicated day, as the time dial moves through its 24-hour period, any actuator pin 90 in an "operative" position in an opening 86 will have its outer portion 98B cam the projection 109 outwardly therefrom, thereby moving the actuation lever 102 against the button 80 and closing the micro switch 60. If the switch 39 is set in its "AUTO" position, a load output will be placed across connectors 42 and 52 (see FIG. 10).

Figure 14:
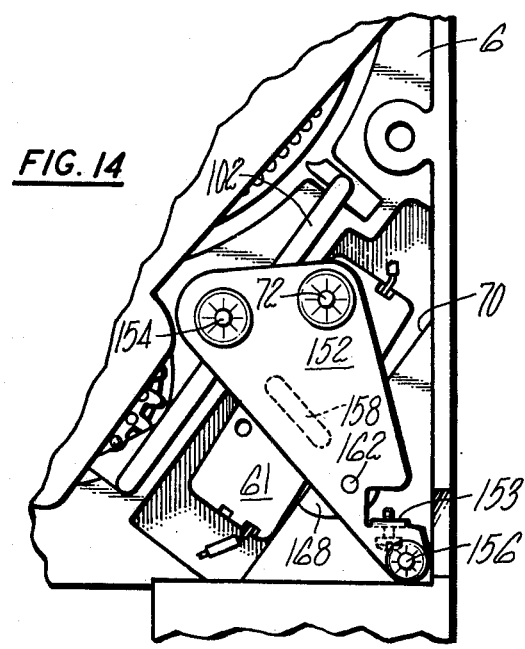
FIG. 14 is a view similar to FIG. 11 showing a cover plate holding the micro switch housing and mechanical mode selector in place.
Figure 15:
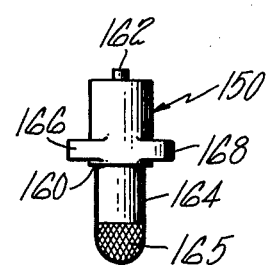
FIG. 15 is a side view of the mechanical mode selector.
Figure 16:
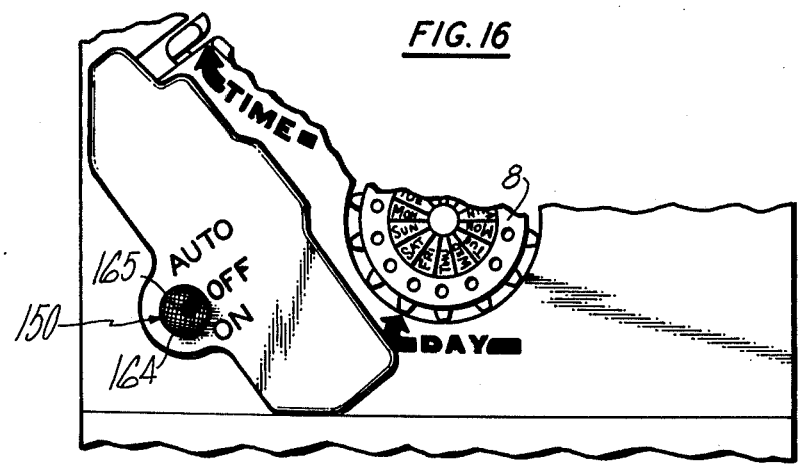
FIG. 16 is a fragmentary view of the front of the modification of the timing device showing the mechanical mode selector set at "OFF" position.

Referring to FIGS. 11–16, a modification of the timer clock device 1 is shown wherein the micro switch housing 61 is pivoted at one end on a post 72. Post 72 extends through a hole in the micro switch housing 61. This is similar to that shown in FIG. 8; however, post 74 has been removed to permit the micro switch housing 61 to pivot about post 72. The micro switch housing 61 can pivot between a position where the end opposite the post 72 can move between a position such as shown in FIG. 14 to a position as shown in FIG. 12. This permits the timer clock device to operate in a similar manner as that shown in FIGS. 1–10 with a manual movement of the micro switch housing 61 and using a simplified schematic diagram as shown in FIG. 19.

Figure 6:
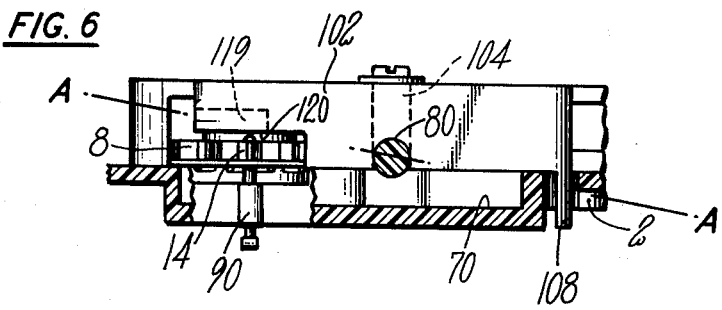
FIG. 6 is a sectional view taken along the line 6—6 of FIG. 2 showing an acutator pin in an inoperative position on the day dial.

A mechanical mode selector 150 is mounted between the plate 6 and a cover plate 152 which is fixed on posts 72, 154 and 156 by fasteners. While post 72 is similar to the post in the first modification, the post 154 extends from the top of pin 104 which extends to the top of the actuation lever 102 as shown in FIG. 6. Post 156 extends away from the corner of the housing plate 6. The cover plate 152 holds the micro switch housing 61 in place, as well as the actuation lever 102 and the manual mode selector 150, permitting the rotation of each of the members. To take up any slack between the micro switch housing 61 in the recess 70 and the surface of cover plate 152 a boss 158 is provided on the underside surface of the cover plate 152. A projection can also extend from the same side of the cover plate around the pins 72 and 156 to aid in properly positioning the micro switch housing 61 and the cover plate 152. Further, the cover plate 152 has a flange 153 extending downwardly therefrom for a purpose to be hereinafter disclosed.

The manual mode selector 150 has an annular face portion 160 which contacts the underside of housing plate 6 and a small post 162 extending from its bottom end which fits into an opening in the cover plate 152 (see FIG. 14). The portion of the manual mode selector 150 between the annular face portion 160 and its bottom is generally cylindrical in shape with two cams, 166 and 168, extending therefrom. The cam 168 is used to select automatic operation while cam 166 is used to select the "ON" position. The operation of these will hereinafter be disclosed. The upper end of the manual mode selector 150 extends upwardly from the annular face portion 160 as a smaller cylindrical portion 164 which extends through the housing plate 6 to the forward face of the timer clock device with a knurled portion 165 on the end having an arrow thereon to accurately position the two cams 166 and 168.

With the arrow of the knurled portion 165 (see FIG. 16) pointing at "OFF", the two cams 166 and 168 are positioned so as not to extend over the recess 70, as shown in FIG. 11, so that the micro switch housing 61 cannot be engaged. This permits the housing 61 to pivot around post 72 positioning the operating button 80 of the micro switch away from the actuation lever 102 a distance so that when the actuation lever 102 is in a position shown in FIG. 10, that is, with the actuation lever 102 in its actuating position with one end 109 opposite and contacting an arc face 98B of an actuator pin 90 in the time dial 2 with the other end 119 opposite and contacting a cylindrical pin 96 of an actuator pin 90 in the day dial 8, the actuation lever 102 cannot push the button 80 far enough to actuate the micro switch 60.

With the arrow of the knurled portion 165 pointing at "ON", the cam 166 is positioned so as to engage the micro switch housing 61 and pivot it around post 72 to a position toward the actuation lever 102, as shown in FIG. 12, so that the button 80 which engages said actuation lever will be pressed to a position where the micro switch 60 will be in a closed position. This will achieve a continuous load output until the manual mode selector 150 is turned to "OFF".

With the arrow of the knurled portion 165 pointing at "AUTO", the cam 168 is positioned so as to engage the micro switch housing 61 and pivot it around post 72 to a predetermined position toward the actuation lever 102, as shown in FIG. 13, so that the button 80 which engages said actuation lever will be pressed to a position where the actuation lever 102 will move the button 80 further into the micro switch housing 61, placing the micro switch in a closed position, when the actuation lever is contacted at both ends by the pins 90 of the time dial 2 and day dial 8 (the position shown in FIG. 10).

To accurately position the cam 168 so as to vary the movement which the button 80 will have to make to close the switch, a variable stop 170 is provided which includes an adjustable screw 172 positioned in the flange 153, referred to above, extending downwardly from the cover plate 152. As can be seen from FIG. 13, movement of the screw 172 can vary the point on cam 164 which will contact the side of the micro switch housing 61. While one variable stop 170 has been shown, other known variable stop means can be used.

Figure 17:
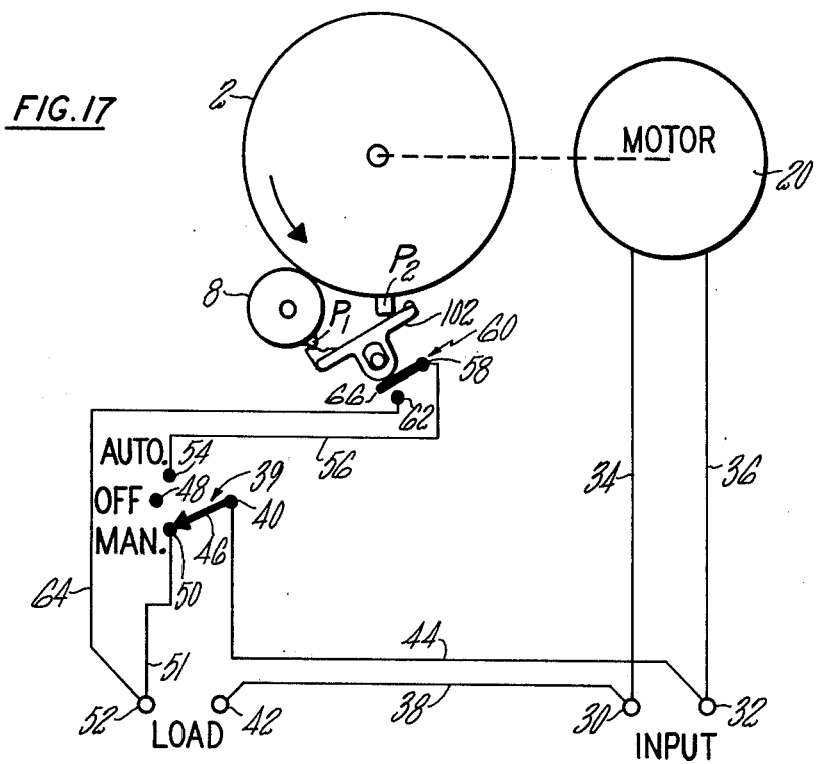
FIG. 17 is a schematic diagram of the electric circuitry on the housing plate in the modification shown in FIGS. 1-10.

FIG. 17 is a schematic diagram of the electric circuitry shown in the modification of FIGS. 1–10 with its operation being set forth above. The actuation lever 102 is shown being engaged at one end by a projection $P_1$ which is a schematic representation of a pin 90 in an operative position in day dial 8 and about to be engaged at its other end by projection $P_2$ which is a schematic representation of a pin 90 in an operative position in time dial 2. Engagement at both ends will close micro switch 60.

FIG. 19 is a schematic diagram of the electric circuitry shown in the modification of FIGS. 11–16, and it differs from that shown in FIG. 17 in that line 51 and switch 39 have been omitted and line 44 has been directly connected to line 56 and identified in FIG. 19 as 44A. The representation of the pins 90 on the day dial 8 and the time dial 2 is the same, while a mechanical difference is the pivotal movement of the micro switch housing 61 to obtain the various modes of operation as set forth above.

Figure 18:
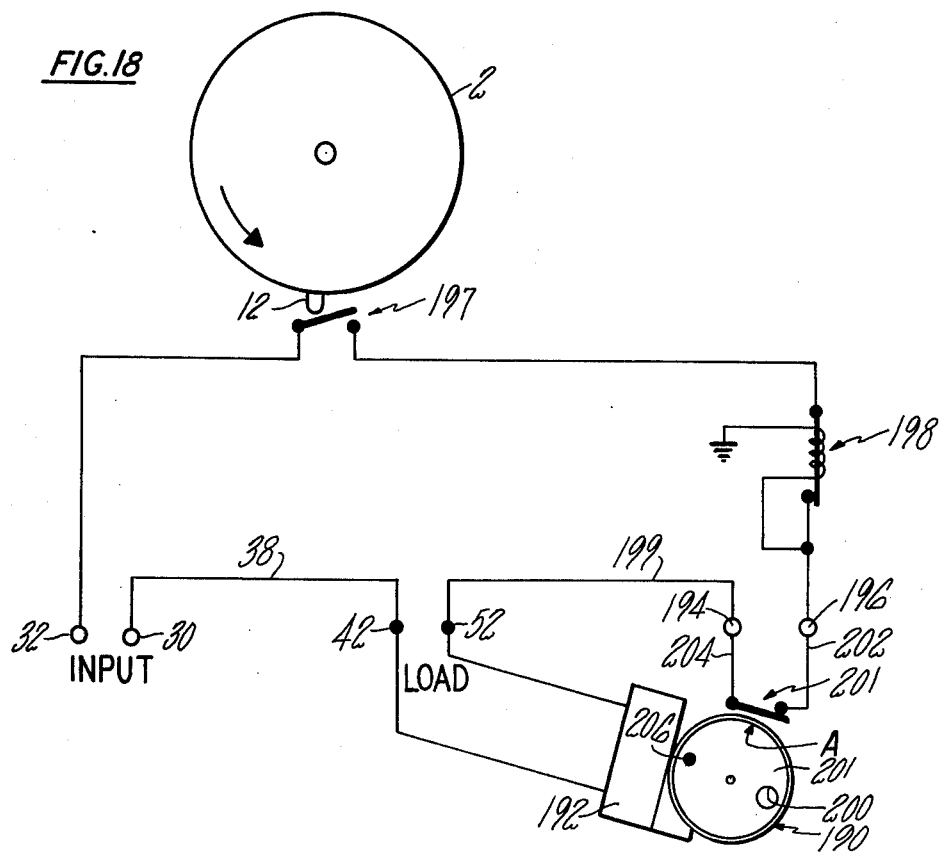
FIG. 18 is a schematic diagram of an addition to the electric circuitry of the timing device to provide automatically at spaced time intervals for precise positioning of the timer and a device being operated.

FIG. 18 is a schematic diagram of additional electric circuitry which can be used with the schematic diagrams as shown in FIGS. 17 and 19 to automatically provide for precise positioning of the time dial 2 with a device being operated having a predetermined number of cyclic positions, each position being intended to match a predetermined pin location around a time dial 2. A device being operated could be a sequencing valve 190, as shown in U.S. Pat. No. 3,460,560, which has four positions. The load across connectors 42 and 52 could operate a solenoid valve 192 which could apply and reduce a line pressure to the sequencing valve 190. In other words, as a load operated the solenoid valve 192, the opening 200 on disc 201 would be moved, or indexed, to one of four outlet lines to provide a flow to that line and the load would be directed to the solenoid valve until operative pins 90 had moved past the cooperating end of the actuating lever 102. This would turn the solenoid valve off, reducing the pressure in the sequencing valve in preparing the valve to move, or index, the opening 200 to another outlet when the solenoid valve is next operated by operative pins on the time dial 2. If the solenoid valve 190 had four outlets, such as shown in U.S. Pat. No. 3,460,560 and operative pins were placed at four points around the time dial 2 to operate the sequencing valve four times a day to have each of the outlets open for a predetermined time, and if nothing would change the relationship between the time dial 2 and the position of the disc 201 on which the opening 22 is located, then there would be no problem. However, if a dry spell was encountered and the switch 39 moved to its manual position by toggle member 41, the disc 201 of the sequencing valve 190 would be moved one position without regard to the desired sequencing and timing of the system. This would mean that the following day the location of the time dial 4 and disc 201 would not be in order to start a desired cooperating timing and sequencing order.

To rectify this, the circuitry shown in FIG. 18 is provided to reset the system once a day to place the time dial 2 and disc 201 of the solenoid valve in desired positions relative to each other. This is done by providing two other connectors 194 and 196. A line is connected between connector 32 and connector 196 having a switch 197 and a pulsing device 198. A line 199 connects connector 194 to connector 52. Connector 30 is already connected to connector 42 by line 38. When the time dial 2 reaches a predetermined position determined by a precise location of switch 197, the arm 12 closes the switch 197, running a current through the pulsing device to the connector 196. A normally closed magnetic switch 201 is placed adjacent the disc of the sequencing valve 190 with one terminal connected to the connector 196 by line 202 and the other connector connected to connector 194 by line 204. A magnet 206 is embedded in the disc 201 of the sequencing valve 190 and as the pulsing device 198 turns the solenoid valve 192 on and off, the disc 201 will rotate until the magnet reaches point A, at which time it will open the magnetic valve 201. This will stop the pulsing device 198 and therefore the movement of the disc 201 of sequencing valve 190. At this time, the time dial 2 and disc 201 of the solenoid valve 190 will be properly set to obtain the desired operation of the sequencing valve by the pins placed in the time dial 2.

I claim:

1. A timing device having a mounting means, electrical input connectors connected to said mounting means, electrical output connectors connected to said mounting means, a first dial mounted for rotation on said mounting means, a second dial mounted for rotation on said mounting means, an actuation lever, means mounting said actuation lever between its ends on said mounting means for movement by said first and second dials, first contacting means on said first dial for engaging a first part of said actuation lever on one side of said means mounting said actuation lever, second contacting means on said second dial for engaging a second part of said actuation lever on the other side of said means mounting said actuation lever, switch means connected to said mounting means, said switch means including means for actuating said switch means, said switch means being electrically connected between said output and said input connectors for electrically connecting them, said means for actuating said switch means being located adjacent said actuation lever for selective movement thereby so that when only one contacting means engages its part of the actuation lever said actuation lever will not move to in turn move said means for actuating said switch means to actuate said switch means but when said other contacting means engages its respective part of said actuation lever at the same time said actuation lever will move to in turn move said means for actuating said switch means to actuate said switch means.

2. A device as set forth in claim 1 wherein said first contacting means is a pin means.

3. A device as set forth in claim 2 wherein said pin means is removable.

4. A device as set forth in claim 2 wherein said first dial has a flange extending outwardly from the bottom edge thereof around its periphery, a plurality of openings located in said flange, a guide slot being open at the outer periphery of the first dial and being positioned over each opening, each guide slot and opening being adapted to receive said first pin means.

5. A device as set forth in claim 4 wherein said first pin means includes a camming portion, said camming portion extends radially outward from its position in the opening and guide slot and is adapted to engage the one part of said actuation lever.

6. A device as set forth in claim 1 wherein said second contacting means is a pin means.

7. A device as set forth in claim 6 wherein said pin means is removable.

8. A device as set forth in claim 6 wherein said second dial has a plurality of holes spaced around the center thereof, each hole being adapted to receive said second pin means.

9. A device as set forth in claim 8 wherein said second pin means includes a cylindrical portion, said cylindrical portion extending below said second dial and being adapted to engage the other part of said actuation lever.

10. A device as set forth in claim 1 wherein said first contacting means is a first pin means and said second contacting means is a second pin means.

11. A device as set forth in claim 10 wherein said first pin means and second pin means are interchangeable.

12. A device as set forth in claim 10 wherein both said first and second pin means are removable.

13. A device as set forth in claim 12 wherein said first pin means and second pin means are interchangeable.

14. A device as set forth in claim 1 wherein said actuation lever has one end located adjacent the circumference of said first dial and has the other end located adjacent the circumference of said second dial, said means for actuating said switch means having an actuating button located adjacent said actuating lever.

15. A device as set forth in claim 1 wherein said switch means includes a housing means, said housing means being movably mounted with respect to said lever so that it can be moved between a first position where said switch means can be selectively actuated by said lever and a second position where said switch means cannot be actuated by said lever.

16. A device as set forth in claim 15 wherein said housing means can also be moved to a third position where said means for actuating said switch means is actuated by movement against said lever.

17. A device as set forth in claim 15 where a manually operated cam means positions said housing means.

18. A device as set forth in claim 17 wherein adjustment means are provided to accurately position the housing means in its first position to control the precise actuation point of said switch means by said lever.

19. A timing device having a plate means, a first recess located in the front of said plate means, a time dial rotatably mounted in said first recess, a second recess located in the front of said plate means intersecting said first recess, a day dial rotatably mounted in said second recess, said time dial and day dial having coacting members engaging where said first and second recess intersect to have coordinated rotative movement, an actuation lever pivotably mounted at the rear of said plate means, opening means in said plate means making said time dial and said day dial accessible from the rear of said plate means, first contacting means on said time dial for engaging a first part of said actuation lever for a predetermined time through said opening means, second contacting means on said day dial for engaging a second part of said actuation lever for a longer predetermined time period through said opening means, a switch located on the back of said plate means, said switch being electrically connected between output and input connectors, said switch being located in relation to said actuation lever for selective movement thereby so that when only one contacting means engages its part of the actuation lever said actuation lever will not actuate said switch but when said first and second contacting means engage both of their respective parts of said actuation lever at the same time said actuation lever will actuate said switch and electrically connect said input connectors to said output connectors.

20. A timing device as set forth in claim 19 wherein said first part of said actuation lever extends through said opening means to a point adjacent the periphery of said time dial, and said second part of said actuation lever extends through said opening means to a point under said day dial.

21. A timing device as set forth in claim 19 wherein said first contacting means is a first pin means, said first part of said actuation lever contacting the top of said first pin means for actuation, said second contacting means is a second pin means, said second part of said actuation lever contacting the bottom of said second pin means for actuation.

22. A timing device as set forth in claim 21 wherein said first pin means has an engaging surface for determining the length of time said first part of said actuation lever engages it as said time dial rotates.

23. A timing device as set forth in claim 21 wherein said second pin means has an engaging surface for engaging said second part of said actuation lever for a predetermined rotating movement of said time dial.

24. A timing device as set forth in claim 19 wherein said actuation lever has an elongated pivotal opening, said actuation lever being biased toward one end of said pivotal opening, said engagement of both ends of the respective parts of said actuation lever at the same time by the first and second contacting means moves the actuation lever against said biasing means to actuate said switch.

25. A timing device having a mounting means, electrical input connectors connected to said mounting means, electrical output connectors connected to said mounting means, a time dial mounted for rotation on said mounting means, an actuation lever, said actuation lever being mounted for pivotal movement on said mounting means, contacting means on said time dial for engaging one part of said actuation lever at a predetermined time for moving it, a switch, said switch being located in a housing means, said switch being electrically connected between said output and input connectors for electrically connecting them, said housing means being located adjacent to said actuation lever for actuation thereby, switch actuating means extending externally of said housing means, said housing means being movably mounted on said mounting means with respect to said lever so that said housing means can be moved between a first position where said switch actuating means can be actuated by said lever and a second position where said switch actuating means cannot be actuated by said lever.

26. A device as set forth in claim 25 wherein said housing means can also be moved to a third position where said switch actuating means is actuated by its movement against said lever.

27. A device as set forth in claim 25 where a manually operated cam means positions said housing means.

28. A device as set forth in claim 25 wherein adjustment means are provided to accurately position the housing means in its first position to control the precise actuation point of said switch by said lever.

29. A timing device as set forth in claim 1 wherein said means mounting said actuation lever between its ends includes a pivotal mounting whereby said actuation lever can pivot therearound or move in a direction to move said means for actuating said switch means, said means for actuating said switch means being located adjacent said actuation lever where said actuation lever is pivoted between its ends for movement thereby so that when only one contacting means engages its part of the actuation lever said actuation lever will move around its pivotal mounting without moving said means for actuating said switch means to actuate said switch means but when said other contacting means engages its respective part of said actuation lever at the same time said actuation lever will move and in turn move said means for actuating said switch means to actuate said switch means.

30. A timing device as set forth in claim 29 wherein said means mounting said actuation lever between its ends includes a pivotal mounting having an elongated pivotal opening in said actuation lever and a pin extending into said opening from said mounting means, said actuation lever being biased toward one end of said pivotal opening.

31. A timing device as set forth in claim 1 wherein said first dial is a time dial.

32. A timing device as set forth in claim 1 wherein said second dial is a time period dial.

33. A timing device as set forth in claim 1 including means for moving said means for actuating said switch means from its location adjacent said actuation lever for selective movement thereby to another position where said actuation lever cannot move said means for actuating said switch means to actuate said switch means.

34. A timing device as set forth in claim 1 including means for moving said means for actuating said switch means from its location adjacent said actuation lever for selective movement thereby to another position where said means for actuating said switch means is positioned against said lever to actuate said switch means.

35. A timing device having a mounting means, electrical input connectors connected to said mounting means, electrical output connectors connected to said mounting means, a normally open switch means connected to said mounting means, said switch means being electrically connected between said output and said input connectors for electrically connecting them, projection means projecting from said switch means for actuating said switch means to electrically connect said input connectors to said output connectors, a first control means, a second control means, an actuation lever, means mounting said actuation lever between its ends on said mounting means for movement by said first and second control means, first contacting means on said first control means for engaging a first part of said actuation lever on one side of said means mounting said actuation lever, second contacting means on said second control means for engaging a second part of said actuation lever on the other side of said means mounting said actuation lever, said projection means being located adjacent said actuation lever for selective movement thereby so that when only one contacting means engages its part of the actuation lever said actuation lever will not move to in turn move said projection means for actuating said switch means to actuate said switch means but when said other contacting means engages its respective part of said actuation lever at the same time said actuation lever will move to in turn move said projection means for actuating said switch means to actuate said switch means.

* * * * *